(12) United States Patent
Liang

(10) Patent No.: US 10,496,948 B1
(45) Date of Patent: Dec. 3, 2019

(54) COMPUTER TREND VISUALIZATION USING QUADRATIC SIMPLIFIED CLOSED FORM LINEAR REGRESSION

(71) Applicant: XACTLY CORPORATION, San Jose, CA (US)

(72) Inventor: Shenshen Liang, San Jose, CA (US)

(73) Assignee: XACTLY CORPORATION, San Jose, CA (US)

( * ) Notice: Subject to any disclaimer, the term of this patent is extended or adjusted under 35 U.S.C. 154(b) by 664 days.

(21) Appl. No.: 14/974,455

(22) Filed: Dec. 18, 2015

(51) Int. Cl.
*G06F 17/18* (2006.01)
*G06F 17/15* (2006.01)
*G06F 17/17* (2006.01)
*G06F 17/11* (2006.01)
*G06F 16/248* (2019.01)
*G06F 16/901* (2019.01)
(Continued)

(52) U.S. Cl.
CPC ....... *G06Q 10/06398* (2013.01); *G06F 16/22* (2019.01); *G06F 16/248* (2019.01); *G06F 16/904* (2019.01); *G06F 16/9024* (2019.01); *G06F 17/11* (2013.01); *G06F 17/15* (2013.01); *G06F 17/17* (2013.01); *G06F 17/18* (2013.01)

(58) Field of Classification Search
CPC .......... G06F 17/30427; G06F 17/3056; G06F 17/30566; G06F 17/18; G06F 17/30539; G06F 17/30554; G06F 17/15; G06F 17/17; G06F 17/11; G06F 16/22; G06F 16/904; G06F 16/9024; G06F 16/248; G06Q 10/0639; G06Q 30/0201; G06Q 30/0202; G06N 20/00
See application file for complete search history.

(56) References Cited

U.S. PATENT DOCUMENTS 6,076,048 A * 6/2000 Gunther ................ F22B 37/421
702/45
6,513,054 B1 * 1/2003 Carroll ...................... G06F 7/48
708/490
(Continued)

OTHER PUBLICATIONS

Gurley; "Numerical Methods Lecture 5—Curve Fitting Techniques" https://www.essie.ufl.edu/~kgurl/Classes/Lect3421/Fall_01/NM5_curve_f01.pdf (Year: 2002).*

(Continued)

*Primary Examiner* — Dennis Truong
(74) *Attorney, Agent, or Firm* — Hickman Palermo Becker Bingham LLP

(57) ABSTRACT

A data processing method comprises receiving a request to analyze a relationship between an explanatory element and a response element and obtaining, in response to the request, data associated with the explanatory element and the response element. The method further comprises determining coefficients for an equation and storing the coefficients in digital computer memory by: computing, using a plurality of processes in parallel and for each of the coefficients, summations derived from a zero first derivative of the equation with respect to each of the coefficients, computing a value for each of the coefficients using the summations, determining, in response to the computing, a vector of response element values in the digital computer memory using the value of each of the coefficients and values representing the explanatory element as input, and causing displaying a trend graph of the relationship.

20 Claims, 5 Drawing Sheets

(51) Int. Cl.
   *G06F 16/904* (2019.01)
   *G06F 16/22* (2019.01)
   *G06Q 10/06* (2012.01)

(56) References Cited

U.S. PATENT DOCUMENTS

| | | | | |
|---|---|---|---|---|
| 9,336,302 | B1* | 5/2016 | Swamy | G06F 17/3071 |
| 9,959,248 | B1* | 5/2018 | Lu | G06F 17/17 |
| 2006/0041403 | A1* | 2/2006 | Jaber | G06F 17/18 |
| | | | | 702/189 |
| 2007/0087756 | A1* | 4/2007 | Hoffberg | G06Q 10/0631 |
| | | | | 455/450 |
| 2011/0046924 | A1* | 2/2011 | Natarajan | G06F 17/18 |
| | | | | 703/2 |
| 2014/0107934 | A1* | 4/2014 | Elashoff | G06F 17/18 |
| | | | | 702/19 |
| 2015/0227656 | A1* | 8/2015 | Mun | G06Q 10/06 |
| | | | | 703/2 |
| 2016/0097808 | A1* | 4/2016 | Drane | G06F 17/505 |
| | | | | 714/725 |
| 2016/0110497 | A1* | 4/2016 | Dzakula | G06F 19/18 |
| | | | | 702/20 |
| 2017/0004358 | A1* | 1/2017 | Bose | G16H 20/30 |
| 2017/0017892 | A1* | 1/2017 | Bernstein | G06F 17/18 |
| 2018/0129961 | A1* | 5/2018 | Kailas | G06F 17/30412 |

OTHER PUBLICATIONS

Lahodny; "Curve Fitting and Parameter Estimation"; www.math.tamu.edu/~glahodny/Math442/Curve%20Fitting.pdf; Spring 2015 (Year: 2015).*

Andrew Que; "Polynomial Regression"; http://polynomialregression.drque.net/math.html; 2015 (Year: 2015).*

* cited by examiner

Equation 300 → $y = a + b \cdot x + c \cdot x^2$

Least Squares 305 → $\Pi = \sum_{i=1}^{n} [y_i - (a + b \cdot x_i + c \cdot x_i^2)]^2 = min$ Zero First Derivatives 310 →
$$\frac{\partial \Pi}{\partial a} = 2 \sum_{i=1}^{n} [(a + b \cdot x_i + c \cdot x_i^2) - y_i] = 0$$
$$\frac{\partial \Pi}{\partial b} = 2 \sum_{i=1}^{n} x_i [(a + b \cdot x_i + c \cdot x_i^2) - y_i] = 0$$
$$\frac{\partial \Pi}{\partial c} = 2 \sum_{i=1}^{n} x_i^2 [(a + b \cdot x_i + c \cdot x_i^2) - y_i] = 0$$

FIG 3A

Expanded Zero First Derivatives 315

$$\sum_{i=1}^{n} y_i = a \sum_{i=1}^{n} 1 + b \sum_{i=1}^{n} x_i + c \sum_{i=1}^{n} x_i^2$$

$$\sum_{i=1}^{n} x_i y_i = a \sum_{i=1}^{n} x_i + b \sum_{i=1}^{n} x_i^2 + c \sum_{i=1}^{n} x_i^3$$

$$\sum_{i=1}^{n} x_i^2 y_i = a \sum_{i=1}^{n} x_i^2 + b \sum_{i=1}^{n} x_i^3 + c \sum_{i=1}^{n} x_i^4$$

Equations for each coefficient 320

$$a = \frac{\sum_{i=1}^{n} y_i \sum_{i=1}^{n} x_i^2 \sum_{i=1}^{n} x_i^4 + \sum_{i=1}^{n} x_i y_i \sum_{i=1}^{n} x_i^2 \sum_{i=1}^{n} x_i^3 + \sum_{i=1}^{n} x_i^2 y_i \sum_{i=1}^{n} x_i \sum_{i=1}^{n} x_i^3 - \sum_{i=1}^{n} x_i^2 \sum_{i=1}^{n} x_i^2 \sum_{i=1}^{n} x_i^2 y_i - \sum_{i=1}^{n} x_i \sum_{i=1}^{n} x_i y_i \sum_{i=1}^{n} x_i^4 - \sum_{i=1}^{n} 1 \sum_{i=1}^{n} x_i^3 \sum_{i=1}^{n} x_i^3 y_i}{\sum_{i=1}^{n} 1 \sum_{i=1}^{n} x_i^2 \sum_{i=1}^{n} x_i^4 + \sum_{i=1}^{n} x_i \sum_{i=1}^{n} x_i^2 \sum_{i=1}^{n} x_i^3 + \sum_{i=1}^{n} x_i^2 \sum_{i=1}^{n} x_i \sum_{i=1}^{n} x_i^3 - \sum_{i=1}^{n} x_i^2 \sum_{i=1}^{n} x_i^2 \sum_{i=1}^{n} x_i^2 - \sum_{i=1}^{n} x_i \sum_{i=1}^{n} x_i \sum_{i=1}^{n} x_i^4 - \sum_{i=1}^{n} 1 \sum_{i=1}^{n} x_i^3 \sum_{i=1}^{n} x_i^3}$$

$$b = \frac{\sum_{i=1}^{n} 1 \sum_{i=1}^{n} x_i y_i \sum_{i=1}^{n} x_i^4 + \sum_{i=1}^{n} x_i \sum_{i=1}^{n} x_i^2 y_i \sum_{i=1}^{n} x_i^2 + \sum_{i=1}^{n} x_i^2 \sum_{i=1}^{n} y_i \sum_{i=1}^{n} x_i^3 - \sum_{i=1}^{n} x_i^2 \sum_{i=1}^{n} x_i y_i \sum_{i=1}^{n} x_i^2 - \sum_{i=1}^{n} x_i \sum_{i=1}^{n} y_i \sum_{i=1}^{n} x_i^4 - \sum_{i=1}^{n} 1 \sum_{i=1}^{n} x_i^3 \sum_{i=1}^{n} x_i^2 y_i}{\sum_{i=1}^{n} 1 \sum_{i=1}^{n} x_i^2 \sum_{i=1}^{n} x_i^4 + \sum_{i=1}^{n} x_i \sum_{i=1}^{n} x_i^2 \sum_{i=1}^{n} x_i^3 + \sum_{i=1}^{n} x_i^2 \sum_{i=1}^{n} x_i \sum_{i=1}^{n} x_i^3 - \sum_{i=1}^{n} x_i^2 \sum_{i=1}^{n} x_i^2 \sum_{i=1}^{n} x_i^2 - \sum_{i=1}^{n} x_i \sum_{i=1}^{n} x_i \sum_{i=1}^{n} x_i^4 - \sum_{i=1}^{n} 1 \sum_{i=1}^{n} x_i^3 \sum_{i=1}^{n} x_i^3}$$

$$c = \frac{\sum_{i=1}^{n} 1 \sum_{i=1}^{n} x_i^2 \sum_{i=1}^{n} x_i^2 y_i + \sum_{i=1}^{n} x_i \sum_{i=1}^{n} x_i y_i \sum_{i=1}^{n} x_i^2 + \sum_{i=1}^{n} x_i^2 \sum_{i=1}^{n} x_i \sum_{i=1}^{n} y_i - \sum_{i=1}^{n} x_i^2 \sum_{i=1}^{n} x_i^2 \sum_{i=1}^{n} y_i - \sum_{i=1}^{n} x_i \sum_{i=1}^{n} x_i \sum_{i=1}^{n} x_i^2 y_i - \sum_{i=1}^{n} 1 \sum_{i=1}^{n} x_i y_i \sum_{i=1}^{n} x_i^3}{\sum_{i=1}^{n} 1 \sum_{i=1}^{n} x_i^2 \sum_{i=1}^{n} x_i^4 + \sum_{i=1}^{n} x_i \sum_{i=1}^{n} x_i^2 \sum_{i=1}^{n} x_i^3 + \sum_{i=1}^{n} x_i^2 \sum_{i=1}^{n} x_i \sum_{i=1}^{n} x_i^3 - \sum_{i=1}^{n} x_i^2 \sum_{i=1}^{n} x_i^2 \sum_{i=1}^{n} x_i^2 - \sum_{i=1}^{n} x_i \sum_{i=1}^{n} x_i \sum_{i=1}^{n} x_i^4 - \sum_{i=1}^{n} 1 \sum_{i=1}^{n} x_i^3 \sum_{i=1}^{n} x_i^3}$$

FIG. 3B

COMPUTER TREND VISUALIZATION USING QUADRATIC SIMPLIFIED CLOSED FORM LINEAR REGRESSION

TECHNICAL FIELD

The present disclosure generally relates to improved methods, computer software and computer systems in the field of data analysis. The disclosure relates more specifically to improving the speed and efficiency at which a trend line may be determined and displayed for comparing data.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Increases in hardware and software support costs has given way to a new technology delivery model in which an application service provider hosts applications coupled to data storage units on networked devices that are owned by the application service provider. The application service provider's customers, typically business enterprises, connect to the hosted applications via a web browser and enter data via the applications with the expectation that the data entered will be available on-demand whenever needed. The customers typically access the data for various data mining or data aggregation operations required to perform various analytics, such as determining particular trends related to their enterprise's operations.

A common way of analyzing trends is to compare one or more elements to one or more other elements, and visualize what the relationship looks like. Specifically, a linear regression is a powerful tool in this context. A linear regression is an approach for modeling the relationship between a scalar response y variable, and one or more explanatory variables, x. Once determined, a linear regression may be used to forecast they variable as output in an accurate manner. However, linear regressions are computationally demanding to generate. Currently, pre-computing of linear regressions on pre-determined data sets is widespread. Pre-computing is necessary because of the large time and processing costs associated with existing solutions. Improved methods of generating linear regressions are needed.

BRIEF DESCRIPTION OF THE DRAWINGS

In the drawings:

FIG. 3A illustrate a first set of equations that may be created, stored and calculated as part of an example of visualizing trends in data in accordance with an embodiment.

FIG. 3B illustrates a second set of equations that may be created, stored and calculated as part of an example of visualizing trends in data in accordance with an embodiment.

DESCRIPTION OF EXAMPLE EMBODIMENTS

Figure 1:
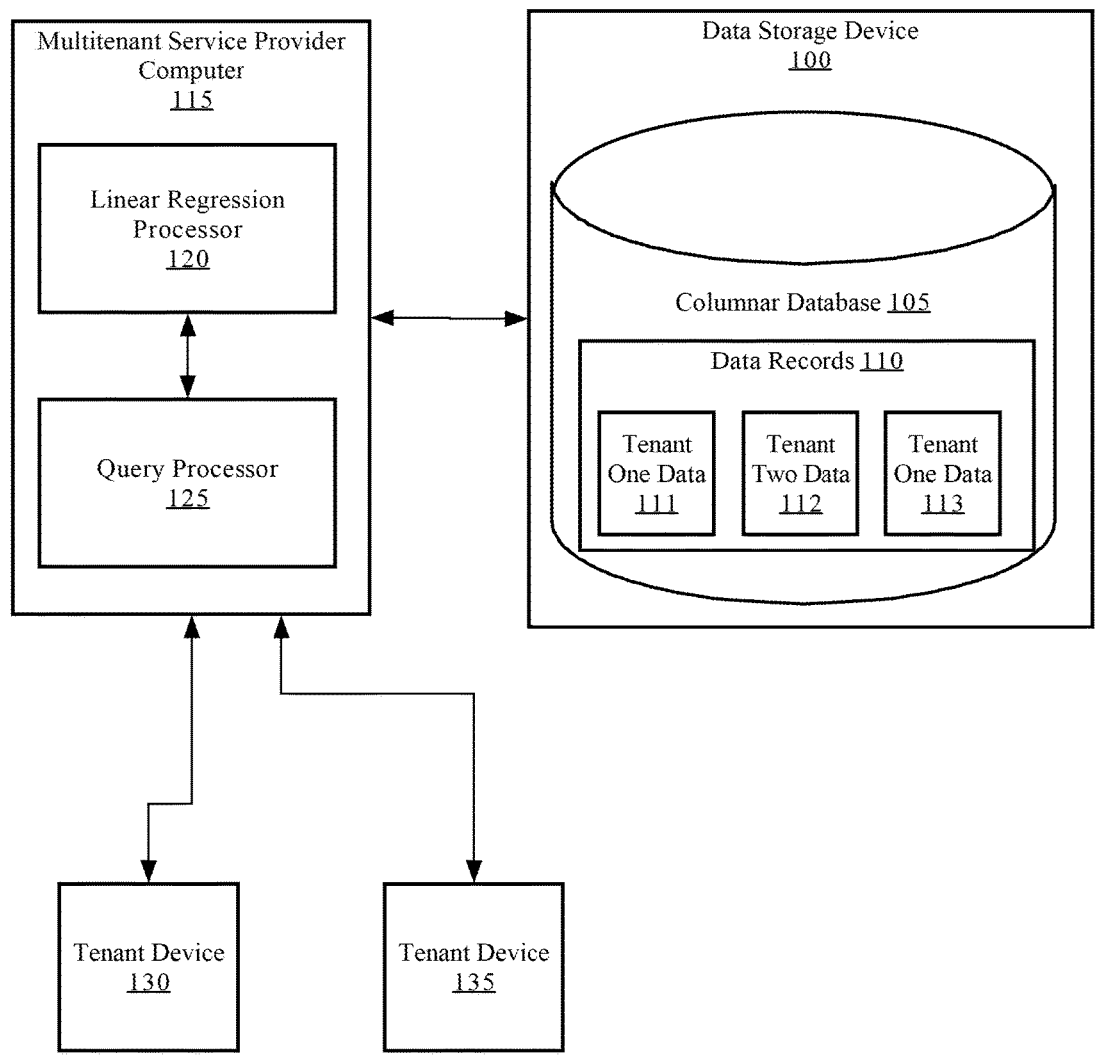
FIG. 1 illustrates a computer system programmed to visualize trends in data in accordance with an embodiment.

In the following description, for the purposes of explanation, numerous specific details are set forth in order to provide a thorough understanding of the present invention. It will be apparent, however, that the present invention may be practiced without these specific details.

In other instances, well-known structures and devices are shown in block diagram form in order to avoid unnecessarily obscuring the present invention. Embodiments are described herein according to the following outline:

1. GENERAL OVERVIEW
2. OVERVIEW OF RELATED TECHNOLOGY AND TERMINOLOGY
3. EXAMPLE SYSTEM IMPLEMENTATION
4. EXAMPLE FUNCTIONAL IMPLEMENTATION
5. EXAMPLE VISUALIZATION OF TRENDS IN DATA
6. IMPLEMENTATION EXAMPLE—HARDWARE OVERVIEW
7. EXTENSIONS AND ALTERNATIVES

1. General Overview

In an embodiment, computer-implemented techniques are provided for improved visualization of trends in data. In one specific approach, an improved computer-implemented technique generates a linear regression without matrix inversion or multiple iterations over the data, enabling rapid comparison of datasets to visualize trends. Embodiments can be implemented in special-purpose computing devices, or programmed general-purpose computers.

Specifically, a request is received to analyze a relationship between an explanatory element and a response element. In response, data associated with the explanatory and response elements is obtained. A form of an equation for analyzing the relationship is determined, such as cubic or quadratic. Values for coefficients of the equation may be determined by: computing, in parallel for each of the coefficients, summations derived from zero first derivatives of the equation with respect to each of the coefficients, and using the summations to compute the value of each coefficient. Subsequently a vector of synthetic explanatory element values and the values of the coefficients may be used to determine a vector of synthetic response variable values. The relationship between the explanatory element and response element may then be analyzed by displaying a trend graph using the two vectors.

All values used in performing these computer-implemented techniques, including source datasets, requests, coefficients, derivatives, and results, may comprise data values that are digitally stored in electronic digital computer memory that is accessed, manipulated and updated using digital processors.

2. Overview of Related Technology and Terminology

Linear regressions are a highly useful tool for modeling the relationship between a scalar response variable, y, and one or more explanatory variables, x. A simple linear regression assumes that the relationship between y and x is linear. More complex linear regressions, such as a generalized linear regression, do not assume that the relationship is linear. Rather, in a generalized linear regression, the model is related to the response variable via a link function and the magnitude of variance of each measurement is a function of the predicted value. Consequently, a graph of the output of a generalized regression may comprise a curve.

Generally, there are two ways to generate a linear regression. The gradient descent approach repeatedly iterates through the data and gradually updates the linear regression to eventually arrive at the answer. This method suffers from major losses of performance and efficiency, as a large amount of reads and/or writes are required as the method iterates through the data repeatedly. The second way involves using a closed-form solution. However, in conventional closed-form solution methods, calculating a matrix inversion is required to arrive at the linear regression. On large data sets, the matrix inversion is too time consuming to be practical. There is a need, in real-time online systems, to implement regression calculating techniques that can provide rapid responses to user queries.

The efficiency issues discussed above become more pressing in a big data environment, which is becoming an increasingly important aspect of all companies. The insights that can be gained by analyzing large quantities of data are invaluable. Many different methods, programs, and solutions have been developed. Apache HBase, developed by the Apache Software Foundation of Forest Hill, Maryland, is a non-relational distributed database capable of handling tremendous amounts of data in an efficient manner. Although reference may be made to HBase throughout this specification, the invention is applicable to many other database applications and/or implementations, and should not be limited to HBase.

Further, in the following description reference will be made to both data stores and databases. A data store is a repository for data. Similarly, a database is structured data store. A database may be structured in any suitable way, and should not be limited by the examples provided herein. Further, while reference may be made to either a data store or database, the invention is not limited to one or the other. In other words, when a database is used to describe one embodiment of the invention, a data store may also be used. Likewise, if a data store is used to describe another embodiment, a database may also be used.

Multitenancy refers to a single instance of software running on a server and servicing multiple tenants. A "tenant," in this context, typically is a legal entity that has no relationship to another tenant, and in fact plural tenants in the system may be competitors who do not share data for competitive reasons.

HBase may be used in conjunction with a multitenant service or application. For example, an HBase database may be used by many companies to store their compensation data in a shared database coupled via networks to one or more server computers that execute instances of server-based applications that implement a multitenant service or system. An example of a multitenant system is XACTLY INCENT ENTERPRISE, commercially available from Xactly Corporation, San Jose, Calif.; it is hosted by a service provider to provide shared access to custom applications that provide specialized analysis, reporting, and visualization of the compensation data. While use of the applications or application instances may be shared, data is effectively segregated by tenant to prevent transfer of confidential information of tenant to another.

In an embodiment, each company retains full access to its private data, and may also gain access to aggregated, anonymized data from all other tenants. Alternatively, the aggregated data may not be anonymized. The aggregated data may be made available in many different ways, and may be used by each individual company as a benchmark for use in a variety of ways, such as determining whether their employees are properly compensated.

For purposes of illustrating a clear example, throughout this detailed description, references will be made to compensation data as the type of data that is stored. However, other embodiments may be implemented for use with other kinds of data and embodiments are not limited to compensation data.

3. Example System Implementation

FIG. 1 illustrates an example computer system in which the techniques described may be practiced, according to one embodiment.

In an embodiment, the computer system of FIG. 1 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

The system shown in FIG. 1 includes data storage device 100, columnar database 105, data records 110, tenant one data 111, 113, tenant two data 112, multitenant service provider computer 115, linear regression processor 120, query processor 125, and tenant device 130, 135. Data storage device 100 may be any suitable storage device such as one or more hard disk drives, memories, or any other electronic digital data recording device configured to store data. Although data storage device 100 is depicted as a single device in FIG. 1, data storage device 100 may span multiple devices located in one or more physical locations. For example, data storage device 100 may be one or more nodes located at a data warehouse(s). Additionally, in one embodiment, data storage device 100 may be located on the same device(s) as multitenant service provider computer 115. Alternatively, data storage device 100 may be located on a separate device(s) from multitenant service provider computer 115.

In one embodiment, data storage device 100 includes columnar database 105, data records 110, tenant one data 111, 113, and tenant two data 112. Columnar database 105 is a database implemented using any suitable methodology, such as HBase. Columnar database 105 may be of any size, portioned into any number of tables or other units, and may be organized in any way. Columnar database 105 stores data records 110. Depending on the intended use of columnar database 105, data records 110 may relate to any number of different tenants, such as tenant one data 111, 113, and/or tenant two data 112. For purposes of illustrating a clear example, FIG. 1 and other description herein refers to two (2) tenants denoted tenant one and tenant two, but other embodiments may be implemented in connection with any number of tenants, including hundreds to thousands of tenants or more, depending upon CPU power, throughput, or other resources.

The data records 110 may relate to any type of data, such as personal information, business information, governmental data, compensation data, health data, environmental data, police/military data, etc. In one embodiment, under control of utility or application programs executed using multitenant service provider computer 115, data records 110 may be aggregated and/or anonymized, so that the data from many different tenants is accessible together. Thus, tenant one data 111, 113, and tenant two data 112 may be stored together and accessible by either tenant, and/or a third party, in an anonymized or non-anonymized fashion. Additionally, under control of utility or application programs executed using multitenant service provider computer 115, data related to a specific tenant is accessible by that specific tenant in a non-anonymized manner. In other words, under control of utility or application programs executed using multitenant service provider computer 115, tenant one may access tenant one data 111, 113 and view all of the specific details, while if another party (e.g., tenant two) were to attempt to access tenant one data 111, 113, at most they would be able to view some anonymized details about the contents (typically access to individual records of another tenant is not allowed, rather, data of other tenants is accessed in an aggregated and anonymized manner). In particular, when aggregated and anonymized, data records 110 may be analyzed to view trends about the data in a large context, such as industry-wide. However, even when not aggregated and/or anonymized, data records 110 may be analyzed to view trends, such as trends for a specific tenant based on data provided by that tenant.

In one embodiment, multitenant service provider computer 115 is owned by, operated by, or associated with an application service provider that provides an online, real-time application program based upon a SaaS environment that multiple tenants, such as the tenants of tenant device 130, 135, may access using client computers coupled over one or more networks to multitenant service provider computer 115. In an embodiment, each tenant comprises one or more computers (i.e., tenant device 130, 135) associated with a different business enterprise that has a customer relationship with the service provider that owns or operates the multitenant service provider computer 115. Multitenant service provider computer 115 is communicatively connected to data storage device 100 and tenant device 130, 135 using any suitable wired and/or wireless connection. Optionally, instead of a multitenant service provider computer 115, a server computer or other device may be used that includes all of the functionality associated with multitenant service provider computer 115.

In one embodiment, multitenant service provider computer 115 may provide any number of different applications to any number of tenants. Specifically, multitenant service provider computer 115 may provide one or more applications (not shown) that enable tenants to store and/or access data on data storage device 100. The application(s) may enable tenants to perform a variety of analyses on their data, as well as other's data, such as aggregated benchmark data. For example, the application may be a business application; an example is XACTLY INSIGHTS, commercially available from Xactly Corporation. In one specific embodiment, the applications executed by multitenant service provider computer 115 are linear regression processor 120 and query processor 125.

In one embodiment, linear regression processor 120 comprises program instructions that are programmed or configured to identify an equation for analyzing a relationship. The equation used for analyzing the relationship may be any equation, and may be identified in any manner. In one embodiment, linear regression processor 120 uses a closed form equation as a base from which to deduce and/or expand the closed form equation into a more easily solvable equation(s). Specifically, the equation may be based on the elements and/or relationship to be analyzed. For example, a two dimensional relationship may be represented with an equation of quadratic complexity, such as $$y=a+bx+cx^2.$$

In the above example equation of quadratic complexity, y is the actual response variable or element, x is the actual explanatory variable or element, and the coefficients that will subsequently be solved for are a, b, and c. Specifically, x and y are any number of (x, y) pairs that may be used as inputs to explore the relationship between x and y. Alternatively, linear regression processor 120 may utilize an equation of greater complexity for two dimensional relationships. Additionally, linear regression processor may select a complexity for a linear regression equation based on the number of explanatory variables. For example, a quadratic relationship may be utilized for situations with one explanatory variable while a cube relationship is utilized for situations with two explanatory variables.

In an embodiment, for a particular type of data set, linear regression processor 120 selects a type of equation to use based on a predetermined complexity of the dataset. For example, multitenant service provider computer 115 may perform linear regression analyses on different types of datasets from different tenant devices. For each type of data set, linear regression processor 120 may perform the methods described herein for a plurality of data sets using equations of varying complexity. Linear regression processor 120 may then identify a complexity for each type of data that creates the best fits. Thus, if a cube complexity tends to over fit aggregated benchmark data, linear regression processor 120 may utilize equations with quadratic complexity for aggregated benchmark data. In contrast, if a quadratic complexity tends to under fit political polling data, linear regression processor 120 may utilize equations with cube complexity for political polling data.

In one embodiment, linear regression processor 120 comprises program instructions that are programmed or configured to analyze a relationship in a big data context. Specifically, the data to be analyzed is aggregated, anonymized data from many different tenants. This results in a large volume of data points, such as tens of thousands, hundreds of thousands, or more, although linear regression processor 120 may operate with fewer data points. Linear regression processor 120 is programmed to analyze the relationship without precomputing. In other words, linear regression processor 120 is programmed to perform analysis of the relationship rapidly enough that a tenant may request a comparison, and linear regression processor 120 will analyze the relationship and will present the results with a minimal delay, in the order of a few seconds or less. This enables clients of the multitenant service provider to analyze any type of relationship, rather than analyzing only a limited set of precomputed comparisons, or required to wait for completion of offline processing of the relationship. Alternatively, or in addition, the data to be analyzed may be specific to a single tenant. For example, the data may be specific to the tenant requesting the comparison.

In one embodiment, linear regression processor 120 comprises program instructions that are programmed or configured to determine a generalized linear regression by parameterizing the linear regression equation in a manner that minimizes the aggregated differences between the observed data points and the projected data points. For example, given a quadratic equation as described above, linear regression processor 120 may minimize the square differences between the observed value and the projected values using the following equation:

$$\Pi = \sum_{i=1}^{n} [y_i - (a + bx_i + cx_i^2)]^2$$

In the above example equation, n is the number of (x, y) pairs. In one embodiment, there may be a minimum number of (x, y) pairs to successfully determine the relationship between x and y. In the above example, the minimum number of pairs is 3 (i.e., n>=3). Specifically, linear regression processor 120 is programmed to perform, after the type of equation has been identified, solving for each coefficient that minimizes Π by setting the first derivative with respect to each coefficient equal to zero. Thus, for a quadratic equation as described above, linear regression processor 120 may generate three separate minimization equations, one for each coefficient. Continuing the example, each of the three separate minimization equations may be needed to solve an individual coefficient, such as a. As an example, an equation that would satisfy these parameters for the quadratic equation, above, that is deduced from the derivative of y with respect to a is:

$$\frac{\partial \Pi}{\partial a} = 2\sum_{i=1}^{n} [(a + b*x_i + c*x_i^2) - y_i] = 0$$

Similar first derivatives may be generated for each coefficient and set to equal zero. Depending on the identified equation(s), the particular equations used in minimizing the differences between the actual values and the projected values may change. For example, if linear regression processor 120 uses an equation with cubic complexity, linear regression processor 120 may generate minimization equations for each of the four coefficients and solve for the coefficients using the methods described herein.

The minimization equations for each coefficient may be expanded into individual summations, as depicted in FIG. 3A and FIG. 3B. For example, zero first derivatives 310 in FIG. 3A may be expanded into individual summations as expanded zero first derivatives 315. By solving expanded zero first derivatives 315 for each coefficient, linear regression processor 120 may generate equations for each coefficient 320 which are solely dependent on observations of the explanatory variable and observations of the dependent variable. Equations for each coefficient 320 comprise a plurality of summations in a numerator and in a denominator of each equation.

In an embodiment, linear regression processor 120 is programmed or configured to perform each of the summations in parallel. For example, a first process may be assigned to perform a summation of $$\sum_{i=1}^{n} y_i$$

and a second process may be assigned to perform a summation of $$\sum_{i=1}^{n} x_i^2.$$

As each summation is capable of being performed independently of the other summations, linear regression processor 120 is able to efficiently compute the parameters of the linear regression equation by performing each summation concurrently through parallel processes. Linear regression processor 120 may then combine the individual summations to solve for each coefficient. Additionally, summations created by one process may be applied to different portions of equations for each coefficient 320. For example, the summation $$\sum_{i=1}^{n} x_i^2$$

appears eight times in the solution for coefficient a. Instead of assigning each summation to a different process, a single process may perform the computation of the summation $$\sum_{i=1}^{n} x_i^2.$$

The result of the summation $$\sum_{i=1}^{n} x_i^2$$

may then be used in each portion of the computation of any coefficient in which the summation appears. For example, if the summation $$\sum_{i=1}^{n} x_i^2$$

appears in the equation for coefficient "A" and in the equation for coefficient "B," then the result of the summation may be calculated a single time and used in the equation for both coefficient "A" and coefficient "B."

In some embodiments, linear regression processor 120 is initially programmed or configured with equations for each coefficient 320. For example linear regression processor may be configured to, for a given data set, perform the summations of equations for each coefficient 320 without performing the steps of generating a linear regression equation or performing initial minimizations, thereby increasing the efficiency with which a linear regression equation is computed. Thus, upon receiving a request to analyze a relationship between two elements, a plurality of processes may perform summations of the individual elements or powers of the elements as prescribed by equations for each coefficient 320. Linear regression module 120 may then insert the outputs of each summation into one or more processes that compute a value for each coefficient. For example, three processes, each corresponding to one of the three coefficients, may be performed in parallel to compute the coefficients.

In solving the linear equations, data from the two or more elements of the relationship being compared/analyzed may be used as needed. Unlike past approaches, linear regression processor 120 is not programmed to perform matrix inversions, and also is not programmed to iterate over data repeatedly to gradually arrive at the correct answer. This results in substantial improvements in the efficiency and speed at which the generalized linear regression may be determined, as matrix inversion and repeated iterations over data are time and processor heavy operations.

Linear regression processor 120 is programmed, after determining the coefficients, to store the coefficients in any suitable location, such as digital memory, a hard drive, database, etc.

In one embodiment, linear regression processor 120 comprises program instructions that are programmed or configured to determine the vector for representing the relationship. The vector may be determined using the coefficients, and incrementing through potential x values using a small step size. For instance, if the vector is from x [0, 100] the step size may be x=0.1, which would result in approximately 1000 points used to generate the vector. The step size may be smaller, or larger as needed. With a small enough step size, the generated vector will be smooth when displayed to a user. Once generated, the vector may be saved in any location, in any manner or format.

In one embodiment, linear regression processor 120 comprises program instructions that are programmed or configured to visualize the relationship between the two elements. Specifically, linear regression processor 120 may display, or cause to be displayed, the vector as well as the data points corresponding to the two elements on the same graph. The resulting graph allows for an easy comparison of the two elements. The graph may be displayed on any device, such as a tenant device 130, 135.

In one embodiment, query processor 125 comprises program instructions that are programmed or configured to process queries and/or requests of tenants, such as tenant device 130, 135. In one embodiment, query processor 125 takes the inputs received from tenants and translates the queries, encoding a portion into one or more search keys for retrieving data from the database(s).

In one embodiment, the inputs may be received through a web browser, or other application. The inputs may include, for example, selections of filterable elements for searching the database, requests to compare elements using a linear regression, etc. For example, the web browser may present the tenant with one or more drop down boxes, check boxes, or other selectable items to indicate what data the tenant would like to access.

Query processor 125 is programmed to then process, by encoding, the inputs to generate a search key for searching the database. In one embodiment, query processor 125 sends or otherwise provides the results of searching the database to the linear regression processor 120, where the data is analyzed. Query processor 125 may also provide the results of searching the database to the requests tenant device, or other component as needed. In one embodiment, query processor 125 receives requests to analyze relationships between two elements of data, searches the database for the elements of data, and provides linear regression processor 120 with the data so that an analysis may be performed.

In one embodiment, each of the tenant devices 130, 135 comprises one or more computing devices, including, but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like.

Tenant devices 130, 135 may include applications, software, and/or other executable instructions to facilitate various aspects of the invention described herein. Specifically, tenant devices 130, 135 are able to display results of comparing elements from columnar database 105, provide input for searching and/or comparing elements of columnar database 105, and/or any other functionalities needed by the present invention. In one embodiment, there may be any number of tenant devices, and each unique tenant may include one or more devices. Tenant devices 130, 135 are communicatively connected to multitenant service provider computer 115 through any kind of computer network using any combination of wired and/or wireless communication, including, but not limited to: a Local Area Network (LAN), a Wide Area Network (WAN), the Internet, a company network, etc.

4. Example Functional Implementation

Figure 2:
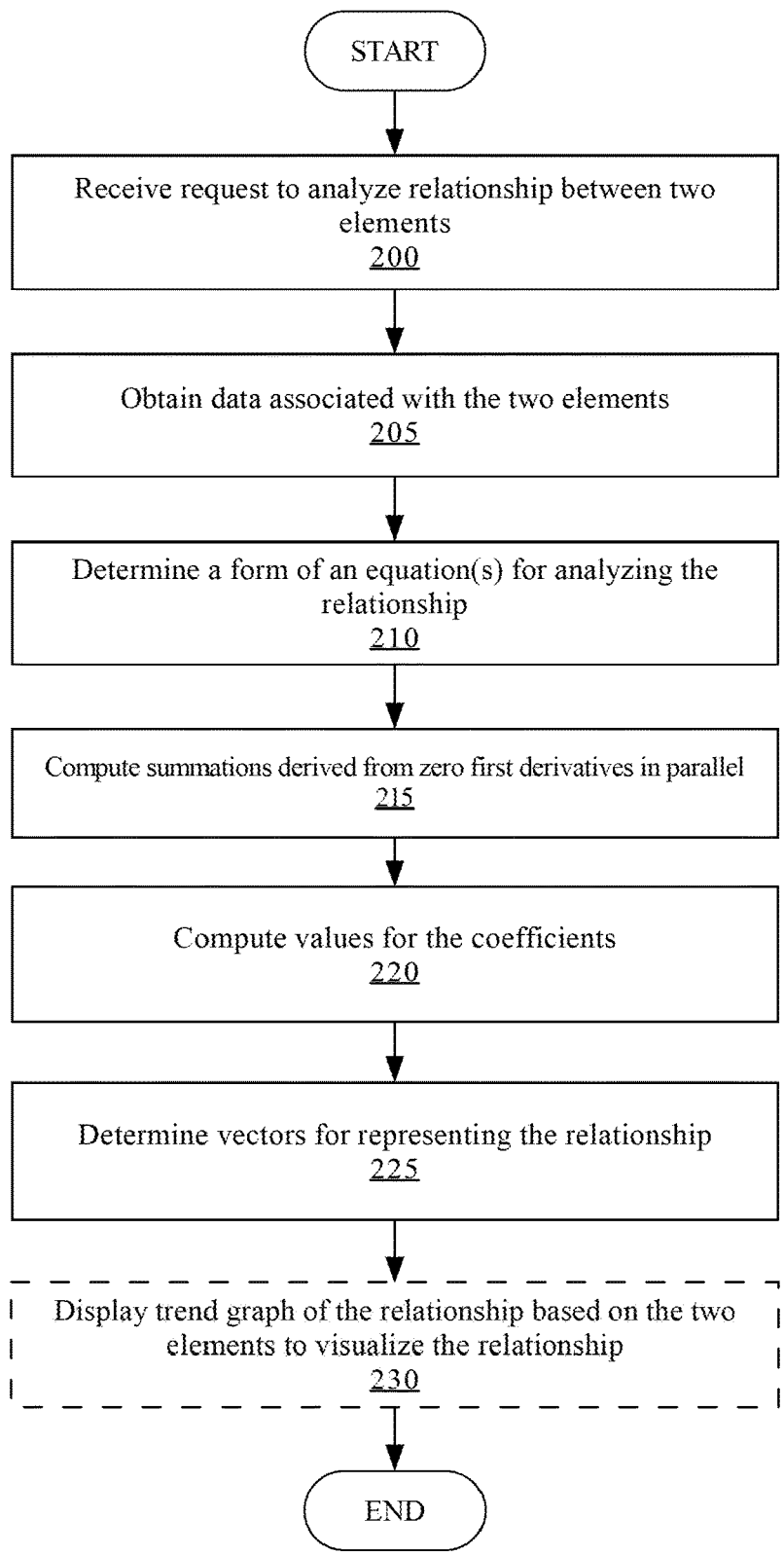
FIG. 2 illustrates a programmable algorithm or method to visualize trends in data in accordance with an embodiment.

FIG. 2 illustrates an example programmable algorithm or method for visualizing trends in data. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 200, a request is received to analyze the relationship between two elements. Optionally, the relationship may involve more than two elements. The elements may be any data points or group of data points. For instance, a first element may be compensation to representatives and the second element may be orders made. Additional examples include, but are not limited to: quota amount vs. target earning, lead conversion vs. revenue, impression vs. clickthrough rate, bonuses given vs. sales, etc. The elements compared may include aggregated, anonymized data from multiple tenants of a multitenant service provider. Alternatively, the elements compared may include data from a single tenant of the multitenant service provider, such as data relating to the tenant requesting the comparison/analysis. The request may be received at any device, such as a server computer, desktop computer, or multitenant service provider computer. As an example, if the relationship is between two elements, one element, such as x, may be the explanatory variable, while the second element, such as y, may be a response variable, as the value of y is determined based on the value of x and the coefficients determined in Step 210. Optionally, the request may include an equation, data, or any other aspect related to analyzing the relationship.

In step 205, data associated with the two elements is obtained. The data may be obtained from any source, such as a data storage device associated with a server computer or multitenant service provider computer. In one embodiment, the data may be retrieved from a database, such as a columnar database. Specifically, the data retrieved may take the form of (x, y) pairs to be used as inputs for determining two vectors to represent the relationship. Any amount of data may be retrieved, such as 10 pairs, 100 pairs, or more. There may be a minimum amount of (x, y) pairs needed to successfully compute the vector, such as three pairs. Alternatively, the minimum amount of (x, y) pairs may be higher or lower. The data retrieved may take any other form, such as data from two columns having the same number of rows, which can be paired up.

In step 210, a form of an equation(s) for analyzing the relationship is determined. The equation may be identified in the request, as discussed in step 200. Alternatively, the equation may be identified based off of the number, type, or other aspects of the elements being compared. For example, when the relationship is two dimensional, an equation of quadratic complexity may be used, such as: $y=a+bx+cx^2$. Other equations may be used, and the invention should not be limited to the example provided herein. Once the form of the equation is determined, the number of coefficients is known. The equation may have any number of coefficients and may be of any complexity. The process of determining a value for the coefficients may be a multistep process, and may include Step 215, 220, and/or any other suitable steps, as discussed below. Some of the steps involved in determining a value for the coefficients are intermediate steps, and may be skipped in some embodiments.

In step 215, summations derived from zero first derivatives are computed in parallel. A zero first derivative is when the first derivative of an equation equals zero. A zero first derivative may be generated with respect to each coefficient, and each zero first derivative may be used in computing a value for each coefficient. In other words, the summations are derived from multiple zero first derivatives and are solved together to compute a value for each coefficient. The summations may be the result of expanding and performing other operations on the zero first derivatives as needed. In the interests of getting the most accurate answer possible, the least square error may be used. The least square error is used to minimize the total differences between predicted and actual results. Additionally, the summations in step 215 may be computed in parallel by one or more different processes. This may greatly improve the speed at which the relationship between the two elements may be analyzed. Once known, the coefficients may optionally be stored in one or more locations, such as memory, a database, etc.

In step 220, values for the coefficients are computed. The values may be computed in any manner. Specifically, the values for the coefficients are calculated using the summations computed in step 215. In one embodiment, the values for the coefficients are computed in parallel. Alternatively, the values for the coefficients may be computed sequentially or in any other manner.

In step 225, vectors for representing the relationship are determined. Specifically, one vector is of response element values determined using the values for the coefficients computed in Step 220 and a vector of explanatory element values. The vector of explanatory element values may be synthetic. In other words, the explanatory element values not represent data that was obtained from a data store. The vector of explanatory element values may be determined by stepping through potential values. The step size used may be any amount, such as 0.01, 0.1, 0.6, 1, etc. The step size used may vary based on the total size of the vector and/or the degree of details and smoothness requested in step 200. Preferably, a small enough step size is used that any graphs created using the vector of explanatory element values and vector of response element values are smooth.

In step 230, a trend graph of the relationship is displayed. Specifically, the two elements and/or vectors are displayed to visualize the relationship. The two elements and the vectors may be displayed in any type of graph, chart, etc. In one embodiment, all (or a portion) of the data points available for the elements are plotted on the graph, with the two vectors representing the relationship displayed on the same graph. As indicated by the dotted lines, the displaying of the graph may occur on a tenant device, rather than on the multitenant service provider, or other component. Optionally, additional steps may be taken besides displaying a graph, such as updating or revising the data used to generate the vector. For example, if the relationship is comparing sales quotas, a server computer or multitenant service provider computer may instruct a tenant computer to revise the sales quotas based on the vector.

5. Example Visualization of Trends in Data

FIG. 3A illustrate a first set of equations that may be created, stored and calculated as part of an example of visualizing trends in data in accordance with an embodiment. FIG. 3B illustrates a second set of equations that may be created, stored and calculated as part of an example of visualizing trends in data in accordance with an embodiment. The example shown in FIG. 3A and FIG. 3B has been simplified for purposes of clarity, and is intended as just one example and not to limit the disclosure to the specifics disclosed herein.

Referring first to FIG. 3A, in one embodiment, initially a request is received to perform a relationship analysis of two elements, such as quota amount and target earning. An equation 300 is identified for representing the relationship. In equation 300, x is an actual explanatory variable or element, y is an actual response variable or element, and x and y form pairs (x, y). Any number of pairs may be used as inputs to the equation(s), although there may be a minimum number of pairs needed to solve an equation(s), such as 3 pairs. Three example pairs may be (3, 6), (5.5, 11), and (6, 12). For the sake of simplicity, in the three example pairs given the relationship between x and y is $y=2x$. Equation 300 also has three coefficients: a, b, and c, each of a currently unknown value. In solving equation 300, the system is programmed to determine the coefficients that generate the most accurate predictions of what y will be, given a value of x. Thus, a least squares error is applied, altering the equation to the form shown as least squares equation 305. In least squares equation 305, n is the number of (x, y) pairs being used as input. Thus, if three pairs are to be used as input, n would equal 3.

To make H in Least Squares 305 minimized, a set of zero first derivatives 310 are calculated based on the equations 305. In an embodiment, the system is programmed to determine a set of expanded zero first derivative for each coefficient, as shown in FIG. 3B. After zero derivates are performed in 310, they are expanded, and the expanded results are shown in expanded zero first derivatives 315. The equations shown here are intermediate steps that may be skipped in some embodiments.

Each of the expanded zero first derivatives 315 can be solved as linear equations for coefficients a, b and c, as shown in FIG. 3B as equations for each coefficient 320.

Once in the form shown in equations for each coefficient 320, values from the elements being analyzed may be used as inputs to determine the coefficient values.

Once the coefficient values are known, a synthetic explanatory vector is generated by stepping through potential values with a small step size. A synthetic response vector is generated by applying synthetic explanatory value into Equation 300 with solved coefficients from Equation 320.

For example, a step size of x=0.1 may be used to generate a smooth explanatory vector for graphing or other display purposes. The vectors may then be displayed in any suitable form, such as a graph.

6. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
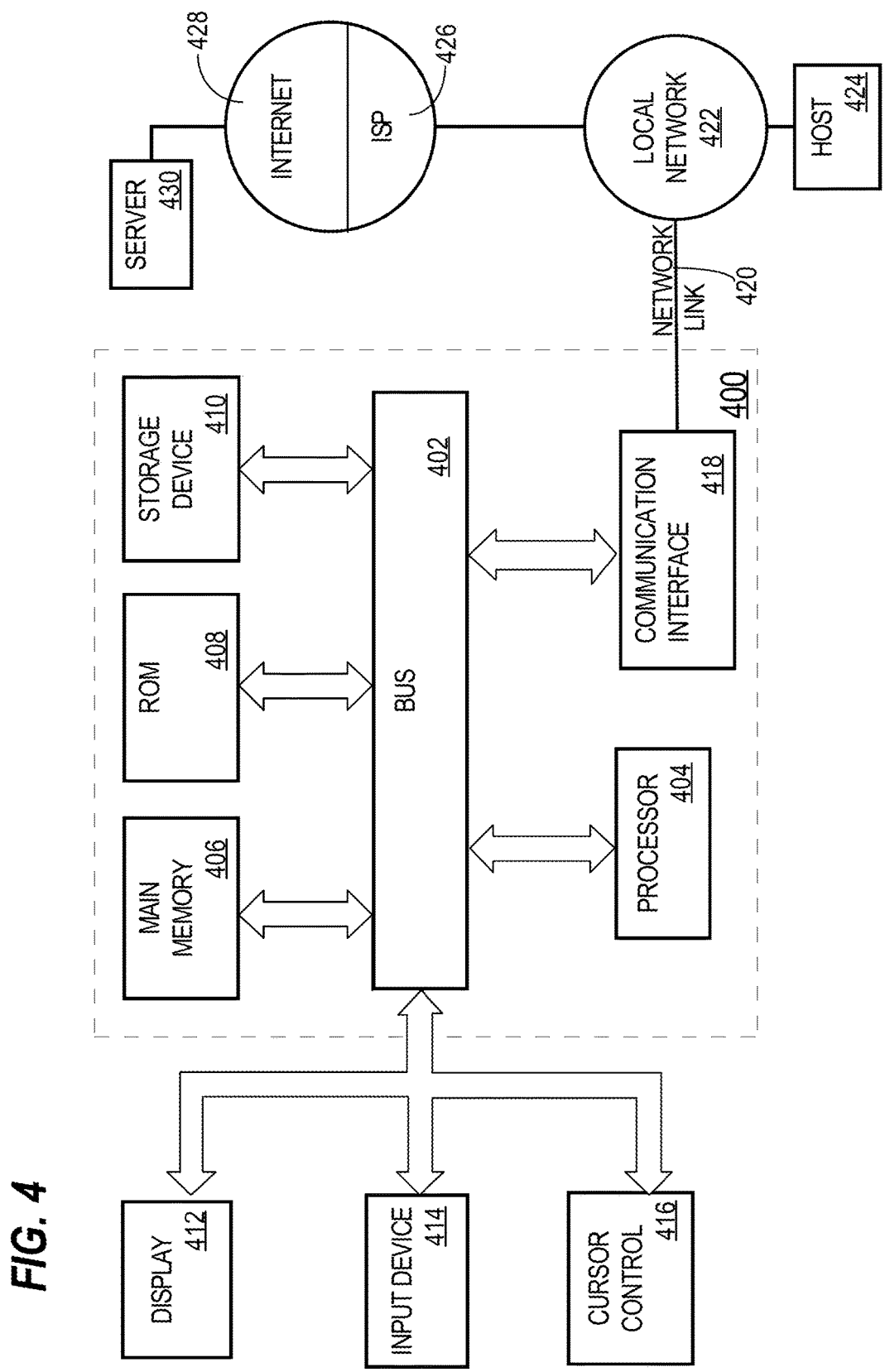
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented data processing method comprising:
   receiving, at a server computer, a request to analyze and display a relationship between an input element and a response to the input element represented by a response element, wherein a plurality of data elements that represent the relationship are stored in a data store;
   obtaining, from the data store in response to the request, the plurality of data elements;
   determining, using the server computer, a plurality of coefficients for a first equation representing the relationship between the input element and the response element by: calculating a set of zero first derivatives from the first equation; calculating a set of expanded zero first derivatives from the set of zero first derivatives; calculating, from the set of expanded zero first derivatives, a second equation for each coefficient of the plurality of coefficients, wherein each second equation includes a plurality of summations; calculating the plurality of summations in parallel, wherein each of the summations is calculated independently of each other; and computing a value for each of the plurality of coefficients using a respective second equation and the plurality of summations;
   determining, using the plurality of data elements, a vector of response element values using the value of each of the plurality of coefficients and a vector of input element values;
   causing displaying, on a display of a tenant computer, a trend graph of the relationship using the vector of response element values and the vector of input element values.

2. The data processing method of claim 1, wherein the server computer is a multitenant service provider computer, and wherein the data store comprises a shared database of records of data of a plurality of different tenants.

3. The data processing method of claim 2, wherein the shared database is a columnar database, and wherein the plurality of data elements that represent the relationship between the input element and the response element is anonymized data from the plurality of different tenants.

4. The data processing method of claim 1, wherein the first equation is an equation of quadratic complexity, and comprises: $y=a+bx+cx^2$.

5. The data processing method of claim 1, wherein the first equation is an equation of cubic complexity.

6. The data processing method of claim 1, wherein the trend graph of the relationship is determined without performing a matrix inversion and without iterating through the data associated with the input element and the response element more than once.

7. The data processing method of claim 1, wherein the first equation is a least squares error equation.

8. The data processing method of claim 1, wherein the input element represents an original assigned sales quota of a particular commissioned sales representative and the response element represents an original personal sales target earnings of the same particular commissioned sales representative.

9. The data processing method of claim 8, further comprising, based on the trend graph, instructing a sales management computer to update the original assigned sales quota of the particular commissioned sales representative to a new assigned sales quota that is different from the original assigned sales quota.

10. A computer system comprising:
   a server computer coupled to a data storage and display device, the server computer programmed to perform:
   receiving a request to analyze a relationship between an input element and a response to the input element represented by a response element, wherein a plurality of data elements that represent the relationship are stored in the data storage;
   obtaining, from the data storage device in response to the request, the plurality of data elements;
   determining a plurality of coefficients for a first equation representing the relationship between the input element and the response element by: calculating a set of zero first derivatives from the first equation; calculating a set of expanded zero first derivatives from the set of zero first derivatives; calculating, from the set of expanded zero first derivatives, a second equation for each coefficient of the plurality of coefficients, wherein each second equation includes a plurality of summations; calculating the plurality of summations in parallel, wherein each of the summations is calculated independently of each other; and computing a value for each of the plurality of coefficients using a respective second equation and the plurality of summations;
   determining, using the plurality of data elements, a vector of response element values using the value of each of the plurality of coefficients and a vector of input element values;

causing displaying, on a display of a tenant computer, a trend graph of the relationship using the vector of response element values and the vector of input element values.

11. The system of claim 10, wherein the server computer is a multitenant service provider computer, and wherein the data storage device comprises a shared database of records of data of a plurality of different tenants.

12. The system of claim 11, wherein the shared database comprises a columnar database, and wherein the plurality of data elements that represent the relationship between the input element and the response element is anonymized data from the plurality of different tenants.

13. The system of claim 10, wherein the first equation is an equation of quadratic complexity, and comprises: y=a+bx+cx^2.

14. The system of claim 10, wherein the first equation comprises an equation of cubic complexity.

15. The system of claim 10, wherein the trend graph of the relationship is determined without performing a matrix inversion and without iterating through the data associated with the input element and the response element more than once.

16. The system of claim 10, wherein the first equation is a least squares error equation.

17. The system of claim 10, wherein the input element represents an original assigned sales quota of a particular commissioned sales representative and the response element represents an original personal sales target earnings of the same particular commissioned sales representative.

18. The system of claim 17, the server computer further programmed to perform, based on the trend graph, instructing a sales management computer to update the original assigned sales quota of the particular commissioned sales representative to a new assigned sales quota that is different from the original assigned sales quota.

19. One or more non-transitory computer-readable media storing one or more programs, the one or more programs comprising instructions for:

receiving, at a server computer, a request to analyze and display a relationship between an input element and a response to the input element represented by a response element, wherein a plurality of data elements that represent the relationship are stored in a data store;

obtaining, from the data store in response to the request, the plurality of data elements;

determining, using the server computer, a plurality of coefficients for a first equation representing the relationship between the input element and the response element by: calculating a set of zero first derivatives from the first equation; calculating a set of expanded zero first derivatives from the set of zero first derivatives; calculating, from the set of expanded zero first derivatives, a second equation for each coefficient of the plurality of coefficients, wherein each second equation includes a plurality of summations; calculating the plurality of summations in parallel, wherein each of the summations is calculated independently of each other; and computing a value for each of the plurality of coefficients using a respective second equation and the plurality of summations;

determining, using the plurality of data elements, a vector of response element values using the value of each of the plurality of coefficients and a vector of input element values;

causing displaying, on a display of a tenant computer, a trend graph of the relationship using the vector of response element values and the vector of input element values.

20. The one or more non-transitory computer readable media of claim 19, wherein the trend graph of the relationship is determined without performing a matrix inversion and without iterating through the data associated with the input element and the response element more than once.

* * * * *